US011729313B2

(12) United States Patent
Garg et al.

(10) Patent No.: US 11,729,313 B2
(45) Date of Patent: Aug. 15, 2023

(54) SPOOFED TELEPHONE CALL IDENTIFIER (71) Applicant: T-Mobile USA, Inc., Bellevue, WA (US)

(72) Inventors: Parag Garg, Woodinville, WA (US); Derrick Ives, North Bend, WA (US); Michele Lundahl, Yarrow Point, WA (US); Helen Wang, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/322,687

(22) Filed: May 17, 2021

(65) Prior Publication Data

US 2022/0368801 A1 Nov. 17, 2022

(51) Int. Cl.
*H04M 3/436* (2006.01)
*H04M 3/42* (2006.01)
*H04W 12/12* (2021.01)

(52) U.S. Cl.
CPC ....... *H04M 3/436* (2013.01); *H04M 3/42042* (2013.01); *H04W 12/12* (2013.01); *H04M 2203/60* (2013.01)

(58) Field of Classification Search
CPC ............. H04M 3/436; H04M 3/42042; H04M 2203/60; H04W 12/12
USPC ..................................... 455/410; 379/142.01
See application file for complete search history.

(56) References Cited

U.S. PATENT DOCUMENTS

| | | | |
|---|---|---|---|
| 7,974,395 B2 | 7/2011 | Abramson et al. | |
| 8,135,119 B1 * | 3/2012 | Zhao | H04M 1/642 379/201.11 |
| 8,774,379 B1 * | 7/2014 | Youngs | H04W 12/126 379/142.04 |
| 9,277,049 B1 * | 3/2016 | Danis | H04M 3/54 |
| 9,356,953 B2 | 5/2016 | Efrati | |
| 9,961,197 B2 | 5/2018 | Kurapati et al. | |
| 10,412,217 B1 * | 9/2019 | Stephens | H04M 3/436 |
| 10,554,821 B1 * | 2/2020 | Koster | H04M 3/436 |

(Continued)

FOREIGN PATENT DOCUMENTS

GB          2582613 A         9/2020

OTHER PUBLICATIONS

European Patent Application No. 22142042.8, Extended European Search Report dated Oct. 12, 2022, 6 pages.

*Primary Examiner* — Binh Kien Tieu
(74) *Attorney, Agent, or Firm* — Han Santos, PLLC (57) ABSTRACT

Methods, systems, and apparatus, including computer programs encoded on a computer storage medium, for implementing a spoofed telephone call identifier are disclosed. In one aspect, a method includes the actions of receiving, by a first computing device, data indicating a placement of a telephone call from a second computing device to a third computing device, wherein the data includes a phone number of the second computing device. The actions further include determining characteristics of the phone number of the second computing device. The actions further include, based on the characteristics of the phone number of the second computing device, determining a likelihood that the phone number of the second computing device is spoofed. The actions further include, based on the likelihood that the phone number of the second computing device is spoofed, determining whether to transmit a notification of the telephone call to the third computing device.

17 Claims, 3 Drawing Sheets

(56) References Cited

U.S. PATENT DOCUMENTS

| | | | |
|---|---|---|---|
| 10,674,009 B1* | 6/2020 | Jakobsson | H04M 3/382 |
| 10,681,206 B1* | 6/2020 | Kreiner | H04M 3/42042 |
| 10,827,338 B1* | 11/2020 | Bodapotula | H04L 65/102 |
| 10,924,609 B1 | 2/2021 | Piscopo, Jr. et al. | |
| 2008/0089501 A1 | 4/2008 | Benco et al. | |
| 2012/0287823 A1 | 11/2012 | Lin | |
| 2019/0281158 A1* | 9/2019 | Gupta | H04L 63/08 |
| 2020/0252504 A1 | 8/2020 | Kreiner et al. | |
| 2021/0203779 A1* | 7/2021 | Piscopo, Jr. | H04L 61/4523 |
| 2022/0094786 A1* | 3/2022 | Thompson | H04M 3/42059 |
| 2022/0248191 A1* | 8/2022 | Garg | H04W 4/16 |

\* cited by examiner

SPOOFED TELEPHONE CALL IDENTIFIER

BACKGROUND

A spoofed telephone call may be one where the true phone number of the caller is replaced with a false telephone number. When the called telephone receives a call with a spoofed phone number, the called phone may display caller identification data that includes the spoofed phone number.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Call spoofing is a technique that nefarious actors can use to hide their actual phone number and imitate a different phone number in an attempt to convince a called party that the called party is receiving a call from a different party. A nefarious actor may place a call to the called party and use various techniques to replace the nefarious actor's actual phone number with a spoofed number. When the called party's service provider receives a notification of the incoming call, the notification may include the spoofed phone number. The service provider provides a notification that includes the spoofed phone number to the called party's phone. The called party's phone rings and displays the spoofed phone number. The called party's phone may also display caller identification information on a screen of the phone and/or output audio of the caller identification information. The caller identification information may include the spoofed phone number and/or a name that corresponds to the spoofed phone number. The called party may answer the call thinking that someone else is calling.

By using call spoofing, the nefarious actor is able to avoid call blocking techniques that the called party and/or the service provider may use to block unwanted calls. Because there are a finite number of telephone numbers, the spoofed number may correspond to an active phone number. If the phone number is active, then the service provider may access data related to the phone number of an incoming phone call to determine whether the phone number is spoofed. Some of the data related to a phone number may include the location of a phone that corresponds to the phone number, the service provider that provides service to that phone, the time and date of previous calls made by the phone number, the other phone numbers previously called by the phone number, and/or any other similar data.

The service provider may process this data related to the phone number using various rules and/or machine learning models. The rules may specify how to compare the various data fields and output data indicating whether the phone number is likely spoofed. The models may be configured to receive the data related to the phone number and output a confidence score that indicates a likelihood that the phone number is likely spoofed. Based on the output of the rules and/or the models, the service provider may determine whether to block the call, permit the call and provide a warning to the called party, or permit the call without providing a warning to the called party. In instances where the phone number is likely spoofed, the service provider may provide a notification to the customer who actually has the spoofed phone number. The service provider may recommend actions for that customer to take to prevent the customer's phone number from being spoofed in the future and/or automatically take those actions.

Figure 1:
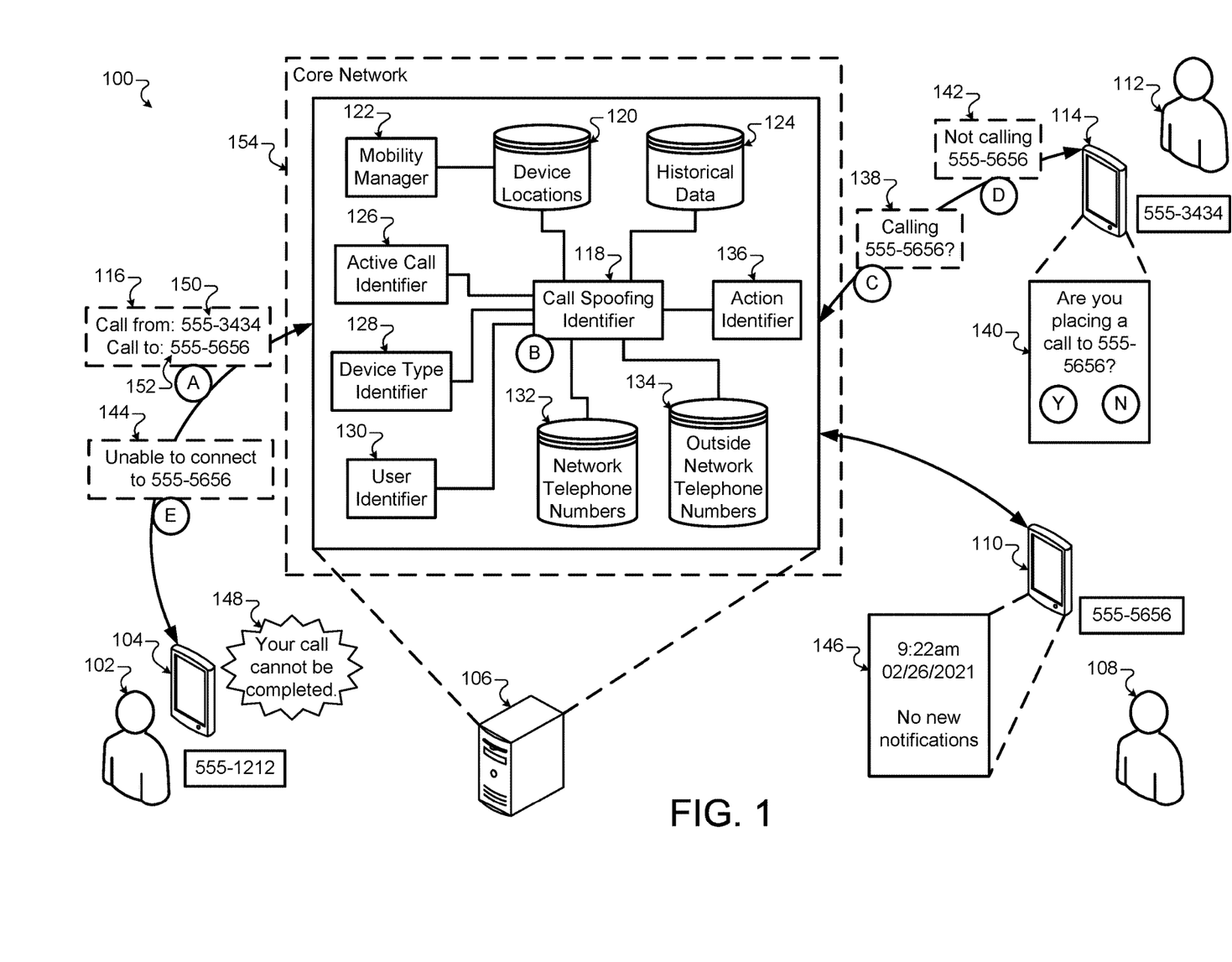
FIG. 1 illustrates an example system that is configured to determine whether the phone number of a telephone call is a spoofed phone number and perform an action based on the determination.

FIG. 1 illustrates an example system 100 that is configured to determine whether the phone number of a telephone call is a spoofed phone number and perform an action based on the determination. Briefly, and as described in more detail below, the system 100 includes a server 106 that receives a telephone call from the computing device 104 of the user 102. The user 102 is attempting to call the computing device 110 of the user 108. The user 102 may be spoofing the phone number of the computing device 114 so that telephone call request 116 from the computing device 104 includes the phone number of the computing device 114. Based on characteristics of the phone number of the computing device 114, the server 106 determines a likelihood that the call from the computing device 110 includes a spoofed number. Based on that likelihood, the server 106 may take various actions including blocking the telephone call, permitting the telephone call, notifying another user, or any other actions.

In more detail and in stage A, the user 102 may use the computing device 104 to communicate with the user 108. The user 102 may place a telephone call to the user 108 using the computing device 104. The computing device 104 may be a mobile phone, tablet, laptop computer, desktop computer, wearable device, and/or any other similar device. The computing device 104 may generate the telephone call request 116. The telephone call request 116 may include the calling phone number 150 and the called phone number 152.

In a situation where the user 102 is not spoofing the calling phone number 150, the calling phone number 150 may reflect the phone number of the computing device 104. For example, if the phone number of the computing device 104 is 555-1212, then the calling phone number 150 of the telephone call request 116 may be 555-1212. In a situation where the user 102 is spoofing the calling phone number 150, the calling phone number 150 may reflect a phone number that is different than the phone number of the computing device 104. For example, if the phone number of the computing device 104 is 555-1212, then the calling phone number 150 of the telephone call request 116 may be 555-3434 or any other phone number that a spoofing application on the computing device 104 may generate or a phone number selected by the user 102.

A spoofing application on the computing device 104 may be configured to disguise the phone number of the computing device 104 or imitate the phone number of a different computing device. The user 102 may use the computing device 104 to place a telephone call and instruct the spoofing application to imitate a phone number that is different than the phone number of the computing device 104. The spoofing application may generate the telephone call request 116 that includes the called phone number 152 that is the phone number of the computing device 110 to which the user 102 is attempting to connect. The telephone call request 116 may also include the calling phone number 150 that is the false phone number generated or received by the spoofing application.

The server 106 may receive the telephone call request 116 from the computing device 104. The telephone call request 116 may not include data indicating that the calling phone number 150 is not the phone number of the computing device 104. Instead, the server 106 may analyze various characteristics of the calling phone number 150 to determine whether the calling phone number 150 is likely a spoofed phone number. Based on the determination of whether the calling phone number 150 is likely a spoofed phone number, the server 106 may take various actions that include connecting the telephone call, blocking the telephone call, or any other similar actions.

The server 106 may be included in or in communication with a network such as a wireless carrier network that provides voice and data communication services to multiple devices, such as the computing devices 104, 110, and 114 and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards. In some implementations, the server 106 may communicate with the computing devices 104, 110, and 114 and other devices using a Wi-Fi network, short range radio, infrared communication, and/or any other similar communication technique.

The wireless carrier network may include a radio access network and a core network 154. The radio access network may include multiple base stations. The multiple base stations are responsible for handling voice and/or data traffic between multiple devices, such as the com computing devices 104, 110, and 114 and other devices and the core network 154. Accordingly, each of the base stations may provide a corresponding network cell that delivers telecommunication and data communication coverage. The core network 154 may use the network cells to provide communication services to the multiple subscriber devices. For example, the core network 154 may connect the multiple devices to other telecommunication and data communication networks, such as the Internet and the public switched telephone network (PSTN). The base stations are responsible handling voice and data traffic between devices and the core network 154. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send radio signals to devices and receive radio signals from devices.

The server 106 may include a call spoofing identifier 118. The call spoofing identifier 118 may be configured to analyze data that reflect various characteristics of the calling phone number 150 to determine a likelihood that the calling phone number 150 is a spoofed phone number. Some of the characteristics may include a location of the computing device 104, a type of the computing device 104, the carrier network associated with the telephone call request 116, the carrier network of another device associated with the calling phone number 150, the location of the other device associated with the calling phone number 150, and/or any other additional characteristics. The call spoofing identifier 118 may generate the likelihood that the calling phone number 150 is a spoofed phone number in the form of a confidence score. Based on the confidence score, an action identifier 136 may determine an action for the call spoofing identifier 118 to perform in response to the telephone call request 116.

The call spoofing identifier 118 may receive location data from the device locations 120. The device locations 120 may include present and previous locations of the computing devices that are communicating through the carrier network of the server 106. In some implementations, the present and previous locations may be stored in association to the computing devices, for example, in a relational database. The computing devices that are communicating through the carrier network of the server 106 may include the computing devices 104, 110, and/or 114. The server 106 may include a mobility manager 122. The mobility manager 122 may be configured to monitor the location of the computing devices 104, 110, and/or 114 that are connected to the server 106 through a wireless base station. The location of the computing devices 104, 110, and/or 114 may include the location of the wireless base station to which the computing devices 104, 110, and/or 114 are connected and/or GPS data received from the computing devices 104, 110, and/or 114. The mobility manager 122 may store the location data in the device locations 120 of the server 106.

In some implementations, the mobility manager 122 may determine the location of the computing devices 104, 110, and/or 114 at periodic intervals, such as every five seconds. In some implementations, the mobility manager 122 may determine the location of a computing devices 104, 110, and/or 114 when the computing devices 104, 110, and/or 114 connect to a different wireless base station and/or provide updated GPS data. In some implementations, the mobility manager 122 may determine the location of the computing devices 104, 110, and/or 114 relative to the base station with which the computing device is communicating. In this case, the mobility manager 122 may determine the relative location based on data collected from the base station such as signal strength and direction of communications between the computing devices 104, 110, and/or 114 and the base station. The mobility manager 122 may also determine the relative location based on the location of the base station and GPS data received from the computing devices 104, 110, and/or 114. The relative location data may include a distance between the computing devices 104, 110, and/or 114 and the base station, the cardinal direction from the base station to the computing devices 104, 110, and/or 114, and/or any other similar measurements.

The call spoofing identifier 118 may receive user identity data from the user identifier 130. The server 106 may include the user identifier 130. The user identifier 130 may be configured to determine the identity of the users 102, 108, and/or 112 and provide the user identity data to the call spoofing identifier 118. In some instances, the computing devices 104, 110, and/or 114 may be associated with a particular user and/or entity. Each user may be associated with various demographic data such as age, gender, and/or other demographic information. The user identifier 130 may provide identity data and/or demographic data to the call spoofing identifier 118 based on the user data associated with the computing devices 104, 110, and/or 114. In some instances, the user identifier 130 may provide data classifying the users 102, 108, and/or 112. For example, the user identifier 130 may provide an age range of the users 102,

108, and/or 112 to the call spoofing identifier 118. In some implementations, the user identifier 130 may provide data indicating whether the computing devices 104, 110, and/or 114 are included in the same account with the wireless carrier, as may be the case for the computing devices of each person who is part of the same household. In some implementations, the user identifier 130 may provide data identifying an account owner of the account of the phone number of the computing devices 104, 110, and/or 114. In some implementations, the user identifier 130 may not have access to identity data for the users 102, 108, and/or 112. In this case, the user identifier 130 may not provide identity data to the call spoofing identifier 118.

In some implementations, the user identifier 130 may determine the user identity data based on the data included in the telephone call request 116. The user identifier 130 may determine the user identity data related to the user 112 of the computing device 114 because the phone number of the computing device 114 matches the calling phone number 150. The user identifier 130 may determine the user identity data related to the user 108 of the computing device 110 because the phone number of the computing device 110 matches the called phone number 152. In some implementations, the user identifier 130 may access data related to the calling phone number 150 and the called phone number 152. This data may include caller identification information that associates a phone number with a name. In some instances, the user identifier 130 may receive data that includes an identifier of the computing device 104. The identifier may be an IMEI number, MAC address, or other similar identifier. The user identifier 130 may access data that associates the identifier of the computing device 104 with a name. The data accessed by the user identifier 130 may be stored on the server 106 in a storage device or accessible by the server 106.

The call spoofing identifier 118 may receive device type data from the device type identifier 128. The server 106 may include the device type identifier 128. The device type data may indicate a type of computing device of the computing devices 104, 110, and/or 114. The device type identifier 128 may be configured to identify a type of device that initiated the telephone call and a type of device that is to receive the telephone call. In some instances, the computing devices 104, 110, and/or 114 may be associated with a phone number. In this case, the device type identifier 128 may access data that relates a phone number to the type of equipment associated with that phone number. In some instances, the computing devices 104, 110, and/or 114 may be associated with a unique identifier such as an international mobile subscriber identity, media access control address, and/or another similar identifier. In this case the device type identifier 128 may access data that relates the unique identifier to the type of equipment associated with that identifier. The accessed data may be stored on the server 106 in a storage device or accessible by the server 106. In some instances, the accessed data may be a database. The device type identifier 128 may provide data identifying the device types of the computing devices 104, 110, and/or 114 to the call spoofing identifier 118.

In some implementations, the device type identifier 128 may determine the device type data based on the data included in the telephone call request 116. The device type identifier 128 may determine the device type data related to the computing device 114 because the phone number of the computing device 114 matches the calling phone number 150. The device type identifier 128 may determine the device type data related to the computing device 110 because the phone number of the computing device 110 matches the called phone number 152.

The call spoofing identifier 118 may receive active call data from the active call identifier 126. The server 106 may include the active call identifier 126. The active call identifier 126 may determine whether the called phone number 152 and/or the calling phone number 150 are participating in a telephone call when the server 106 receives the telephone call request 116. The active call identifier 126 may generate active call data indicating whether the calling phone number 150 is participating in a telephone call. This participation may be different than the telephone call request 116 indicating that a computing device of the calling phone number 150 is attempting to place a telephone call. The active call identifier 126 may generate active call data indicating whether the called phone number 152 is participating in a telephone call. This participation may be different than the telephone call request 116 indicating that a computing device of the calling phone number 150 is attempting to place a telephone call to a computing device of the called phone number 152. In some instances, the active call identifier 126 may access data that indicates which phone numbers are participating in active telephone calls. The data may be stored on the server 106 and/or accessible by a server 106. The data may be stored in a database and may be updated as new telephone calls are placed and ended.

The call spoofing identifier 118 may access the network telephone numbers 132. The network telephone numbers 132 may include data identifying the telephone numbers to which the carrier network of the server 106 provides service. For example, the network telephone numbers 132 may identify the phone numbers of computing device 110 and computing device 114 as phone numbers of computing devices to which the carrier network of the server 106 provides service. The phone number of the computing device 104 may not be included in the network telephone numbers 132 because the carrier network of the server 106 may not provide service to the computing device 104.

The server 106 may continuously update the network telephone numbers 132 as computing devices and/or phone numbers are added to or removed from the carrier network. For example, a customer of the different carrier network may switch to the carrier network of the server 106. The customer may request keeping the same phone number. In this case, the server 106 may add the phone number of the customer to the network telephone numbers 132. As another example, another customer of the carrier network of the server 106 may switch to the different carrier network. The other customer may request keeping the same phone number. In this case, the server 106 may remove the phone number of the other customer from the network telephone numbers 132. In the case of a customer purchasing a new computing device and keeping the same phone number and remaining with the carrier network of the server 106, the server 106 may maintain the phone numbers in the network telephone numbers 132.

The call spoofing identifier 118 may access the outside network telephone numbers 134. The outside network telephone numbers 134 may include data identifying the telephone numbers to which other carrier networks provide service. The other carrier networks may be different than the carrier network of the server 106. For example, the outside network telephone numbers 134 may identify the phone number of computing device 104 as a phone number of a computing device to which other carrier networks provide service. The phone numbers of the computing devices 114 and 110 may not be included in the outside network telephone numbers 134 because the other carrier networks may not provide service to the computing devices 110 and 114.

The server 106 may receive the data for the outside network telephone numbers 134 from other carrier networks. The server 106 may receive the data to update the outside network telephone numbers 134 at periodic intervals, such once per day or week. The server 106 may receive the data to update the outside network telephone numbers 134 in response to a request from the server 106. For example, the server 106 may request updated data for the outside network telephone numbers 134. In response, the server 106 may receive updated data for the outside network telephone numbers 134. The server 106 may request updated data in response to a change in the network telephone numbers 132. The server 106 may request updated data in response to being unable to identify a phone number in either the network telephone numbers 132 and/or the outside network telephone numbers 134.

The call spoofing identifier 118 may access the historical data 124. The historical data 124 may include data related to the computing devices 104, 110, and/or 114. In some implementations, the historical data 124 may include data related to the devices to which the carrier network of the server 106 provides phone and/or data service. The historical data 124 may include a date, time, and/or the duration of previous telephone calls. The historical data 124 may include data indicating whether the called party answered the telephone call, whether the voicemail system answered the telephone call, and/or whether the calling party left a voicemail. The historical data 124 may also include data identifying the calling party and data identifying the called party. The data identifying the calling party may include a phone number of the calling party, a name of the calling party, a geographic location of the calling party at the time of the call, a typical geographic location of the calling party at the time of the call, a network location of the calling party at the time of the call, data identifying a computing device used by the calling party, and/or any other similar information of the calling party. The data identifying the called party may include a phone number of the called party, a name of the called party, a typical geographic location of the called party at the time of the call, a geographic location of the called party at the time of the call, a network location of the called party at the time of the call, data identifying a computing device used by the called party and/or any other similar information of the called party. The typical geographic location may be the locations of the calling party or called party based on pervious movement patterns. For example, if a user is at home ninety percent of the time between the hours of 5 pm and 7 am, then that location would be the typical location of the user if a call is placed during 5 pm and 7 am.

In some implementations, the historical data 124 may include data related to actions that users have performed on the computing devices in addition to telephone call related actions. These actions may include network data received or transmitted by the computing devices. This may include messages sent or received by the computing devices and data related to other applications of the computing devices. The historical data 124 may include data related to applications installed on the computing devices. The server 106 may identify the applications based on the data transmitted and received by the computing devices.

In stage B, the call spoofing identifier 118 may access the network telephone numbers 132 and the outside network telephone numbers 134. The call spoofing identifier 118 may provide the calling phone number 150 and the called phone number 152 to the network telephone numbers 132 and the outside network telephone numbers 134. The call spoofing identifier 118 may determine whether the computing devices correspond to the network telephone numbers 132 and the outside network telephone numbers 134. For example, the call spoofing identifier 118 may determine that both the calling phone number 150 and the called phone number 152 correspond to computing devices to which the carrier network of the server 106 provides service.

The call spoofing identifier 118 may receive the user identity data from the user identifier 130. In some implementations, the call spoofing identifier 118 may receive the user identity data for those computing devices to which the carrier network of the server 106 provides service. For example, the call spoofing identifier 118 may receive user identity data for the user 112 because the user 112 corresponds to the computing device 114 with a phone number that matches the calling phone number 150. The call spoofing identifier 118 may receive user identity data for the user 108 because the user 108 corresponds to the computing device 110 with a phone number that matches the called phone number 152. In some implementations, the call spoofing identifier 118 may be unable to receive user identity data from the user identifier 130 for users who correspond to computing devices to which the carrier network of the server 106 does not provide service, such as user 102.

The call spoofing identifier 118 may receive the device type data from the device type identifier 128. In some implementations, the call spoofing identifier 118 may receive the device type data for those computing devices to which the carrier network of the server 106 provides service. For example, the call spoofing identifier 118 may receive device type data for the computing device 114 because the computing device 114 corresponds to a phone number that matches the calling phone number 150. The call spoofing identifier 118 may receive device type data for the computing device 110 because the computing device 110 corresponds to a phone number that matches the called phone number 152. In some implementations, the call spoofing identifier 118 may be unable to receive device type data from the user identifier 130 for computing devices that correspond to computing devices to which the carrier network of the server 106 does not provide service, such as the computing device 104.

The call spoofing identifier 118 may receive the location data from the device locations 120. In some implementations, the call spoofing identifier 118 may receive the location data for those computing devices to which the carrier network of the server 106 provides service. The location data may include a current location, typical location, home address or billing address that corresponds to the computing device, and/or any other similar location data. For example, the call spoofing identifier 118 may receive location data for the computing device 114 because the computing device 114 corresponds to a phone number that matches the calling phone number 150. The call spoofing identifier 118 may receive location data for the computing device 110 because the computing device 110 corresponds to a phone number that matches the called phone number 152. In some implementations, the call spoofing identifier 118 may be unable to receive location data from the device locations 120 for computing devices that correspond to computing devices to which the carrier network of the server 106 does not provide service, such as the computing device 104.

The call spoofing identifier 118 may receive the historical data from the historical data 124. In some implementations, the call spoofing identifier 118 may receive the historical data for those computing devices to which the carrier network of the server 106 provides service. For example, the call spoofing identifier 118 may receive historical data for the computing device 114 because the computing device 114 corresponds to a phone number that matches the calling phone number 150. The call spoofing identifier 118 may receive historical data for the computing device 110 because the computing device 110 corresponds to a phone number that matches the called phone number 152. In some implementations, the call spoofing identifier 118 may be unable to receive historical data from the historical data 124 for computing devices that correspond to computing devices to which the carrier network of the server 106 does not provide service, such as the computing device 104.

The call spoofing identifier 118 may receive the active call data from the active call identifier 126. In some implementations, the call spoofing identifier 118 may receive the active call data for those computing devices to which the carrier network of the server 106 provides service. For example, the call spoofing identifier 118 may receive active call data for the computing device 114 because the computing device 114 corresponds to a phone number that matches the calling phone number 150. The call spoofing identifier 118 may receive active call data for the computing device 110 because the computing device 110 corresponds to a phone number that matches the called phone number 152. In some implementations, the call spoofing identifier 118 may be unable to receive active call data from the active call identifier 126 for computing devices that correspond to computing devices to which the carrier network of the server 106 does not provide service, such as the computing device 104.

The call spoofing identifier 118 may analyze the user identity data, the device type data, the active call data, the location data, the historical data, and data indicating whether the calling phone number 150 and called phone number 152 are included in the network telephone numbers 132 or the outside network telephone numbers using various rules and/or models. The call spoofing identifier 118 may determine a likelihood that the computing device 104 is spoofing the calling phone number 150 using the models and/or the rules. A confidence score may reflect the likelihood that the computing device 104 is spoofing the calling phone number 150. For example, a confidence score of 0.8 may indicate an eighty percent chance that the computing device 104 is spoofing the calling phone number 150. A confidence score of 0.4 may indicate a forty percent chance that the computing device 104 is spoofing the calling phone number 150.

The models may be configured to receive the user identity data, the device type data, the active call data, the location data, the historical data, and/or data indicating whether the calling phone number 150 and called phone number 152 are included in the network telephone numbers 132 or the outside network telephone numbers 134 using various rules and/or models. The models may be configured to output data indicating the likelihood that the computing device 104 is spoofing the calling phone number 150. The models may be trained using machine learning and historical data. The call spoofing identifier 118 may select a model based on the received data. For example, the call spoofing identifier 118 receives the user identity data, the device type data, the active call data, the location data, and the historical data for the computing device 114 and the user 112 because the calling phone number 150 corresponds to the phone number of the computing device 114. The call spoofing identifier 118 also receives data indicating that the calling phone number 150 is included in the network telephone numbers 132 and data indicating that the called phone number 152 is included in the outside network telephone numbers 134. The call spoofing identifier 118 selects a model that is configured to receive those types of data. The call spoofing identifier 118 provides the data to the selected model and the model outputs the data indicating the likelihood that the computing device 104 is spoofing the calling phone number 150.

The rules may specify how to compare the user identity data, the device type data, the active call data, the location data, the historical data, and data indicating whether the calling phone number 150 and called phone number 152 are included in the network telephone numbers 132 or the outside network telephone numbers using various rules and/or models. Based on the comparison, a rule may specify the likelihood that the computing device 104 is spoofing the calling phone number 150. In some implementations, a rule may specify that the computing device 104 is or is not likely spoofing the calling phone number 150. These determinations may be similar to confidence scores of 0.9 and 0.1. In some implementations, a rule may specify that the computing device 104 is possibly spoofing the calling phone number 150. This determination may be similar to a confidence score of 0.5.

Some example rules may include that if the calling phone number 150 is involved in an active phone call, then the computing device 104 is likely spoofing the calling phone number 150. Another example rule may indicate that if the user 112 has not previously called the called phone number 152, then the computing device 104 is possibly spoofing the calling phone number 150. Another example rule may indicate that if the location of the computing device 104 placing the telephone call does not match the location of the computing device 114, then the computing device 104 is likely spoofing the calling phone number 150.

The call spoofing identifier 118 may provide the data indicating the likelihood that the computing device 104 is spoofing the calling phone number 150 to the action identifier 136. The action identifier 136 may be configured to select an action based on the data indicating the likelihood that the computing device 104 is spoofing the calling phone number 150. Some of the actions may include connecting the telephone call, blocking the telephone call, transmitting a notification to the computing device 114 that corresponds to the calling phone number 150, and/or transmitting a notification to the computing device 110 that corresponds to the called phone number 152.

In some implementations, the action identifier 136 may select an action based on a range within which the data indicating the likelihood that the computing device 104 is spoofing the calling phone number 150 falls. For example, if the data indicating the likelihood that the computing device 104 is spoofing the calling phone number 150 is less than 0.3, then the action identifier 136 may select the action of connecting the telephone call and not providing a notification to the computing device 114 that corresponds to the calling phone number 150. If the data indicating the likelihood that the computing device 104 is spoofing the calling phone number 150 is greater than 0.7, then the action identifier 136 may select the action of blocking the telephone call and providing a notification to the computing device 114 that corresponds to the calling phone number 150. If the data indicating the likelihood that the computing device 104 is spoofing the calling phone number 150 is between 0.3 and 0.7, then the action identifier 136 may select the action of providing a notification to the computing device 114 that corresponds to the calling phone number 150. The notification may request that the user 112 indicate whether the user 112 is placing a call to the called phone number 152.

In the example of FIG. 1, the call spoofing identifier 118 may generate the data indicating the likelihood that the computing device 104 is spoofing the calling phone number 150 of 0.6. The call spoofing identifier 118 may provide the data indicating the likelihood that the computing device 104 is spoofing the calling phone number 150 of 0.6 to the action identifier 136. The action identifier 136 may select the action of providing a notification to the computing device 114 that corresponds to the calling phone number 150. The notification may request that the user 112 indicate whether the user 112 is placing a call to the called phone number 152.

In stage C, the call spoofing identifier 118 performs the action identified by the action identifier 136. In some implementations, the action may specify for the call spoofing identifier 118 to perform a single action. For example, the action may be to connect the telephone call or to block the telephone call. In some implementations, the action may specify for the call spoofing identifier 118 to perform multiple actions. For example, the action may be to block the telephone call and transmit a notification to the computing device 114 that corresponds to the calling phone number 150 indicating that the phone number of the computing device 114 may be spoofed. As another example, the action may be to connect the telephone call and provide a notification to the computing device 114 that corresponds to the calling phone number 150 indicating that there is a small possibility that the phone number of the computing device 114 may be spoofed. As another example, the action may be to block the telephone call and provide a notification to the computing device 114 that corresponds to the calling phone number 150 indicating that there is a high possibility that the phone number of the computing device 114 may be spoofed.

In the example of FIG. 1, the action identifier 136 may select the action of providing a notification to the computing device 114 that corresponds to the calling phone number 150. The notification may request confirmation of whether the user 112 of the computing device 114 is placing a telephone call to the called phone number 152. The call spoofing identifier 118 may generate a notification 138 requesting confirmation whether the user 112 is calling the phone number 152. The computing device 114 may receive the notification 138 and generate the interface 140. The interface 140 may request that the user 112 provide input regarding whether the user 112 is placing a telephone call to the called phone number 152. The interface 140 may be text displayed on the screen of the computing device 114, a banner notification on the screen of the computing device 114, and/or a pop-up interface. In some instances, the computing device 114 may output audio before, during, and/or after displaying the interface 140.

In stage D, the user 112 provides a response to the interface 140. The user 112 may select the "Y" button if the user 112 is placing a telephone call to the called phone number 152. The user 112 may select the "N" button if the user 112 is not placing a telephone call to the called phone number 152. Based on the response from the user 112, the computing device 114 generates the response data 142. The response data 142 may indicate whether the user 112 selected the "N" or "Y" buttons. In some instances, the user 112 may not provide a response within a threshold period of time. In this case, the response data 142 may indicate that the user 112 did not provide a response. The call spoofing identifier 118 may treat the lack of a response in a similar manner as a selection of the "N" button or the "Y" button.

In some instances, the call spoofing identifier 118 may treat the lack of response as a selection of the "N" button or the "Y" button based on the data indicating the likelihood that the computing device 104 is spoofing the calling phone number 150. If the data indicating the likelihood that the computing device 104 is spoofing the calling phone number 150 indicates that it is more likely than not that the computing device 104 is spoofing the calling phone number 150 (e.g., confidence score is greater than 0.5), then the lack of response may be treated as a selection of the "N" button. If the data indicating the likelihood that the computing device 104 is spoofing the calling phone number 150 indicates that it is less likely than not that the computing device 104 is spoofing the calling phone number 150 (e.g., confidence score is less than 0.5), then the lack of response may be treated as a selection of the "Y" button.

In some implementations, the period of time that the call spoofing identifier 118 may wait for a response may be based on the likelihood that the computing device 104 is spoofing the calling phone number 150. The smaller the difference between a confidence score of 0.5 and the likelihood that the computing device 104 is spoofing the calling phone number 150, the smaller the period of time. For example, if the likelihood that the computing device 104 is spoofing the calling phone number 150 is a confidence score of 0.65, then the period of time may be five seconds. If the likelihood that the computing device 104 is spoofing the calling phone number 150 is a confidence score of 0.55, then the period of time may be ten seconds. The call spoofing identifier 118 may allow the user 112 more time to respond to the notification 138 as the confidence of the call spoofing identifier 118 decreases.

In the example of FIG. 1, the user 112 may view the interface 140 on the computing device 114. The user 112 may select the "N" button to indicate that the user 112 is not placing a call to the called phone number 152 of 555-5656. The computing device 114 may generate the response data 142. The response data 142 may indicate that the user 112 is not placing a call to the called phone number 152 of 555-5656.

The call spoofing identifier 118 may receive the response data 142. Based on the response data 142, the call spoofing identifier 118 may determine to connect the telephone call or block the telephone call. If the call spoofing identifier 118 determines to connect the telephone call, then the server 106 may provide a notification to the computing device 110 indicating that the computing device 110 is receiving an incoming telephone call. The notification may include the calling phone number 150. The computing device 110 may display the calling phone number 150 and any related caller identification information. The user 108 may answer the phone call and begin talking to the user 102.

If the call spoofing identifier 118 determines to block the telephone call, then the server 106 may provide a notification to the computing device 104 indicating that the telephone call cannot be completed. In the example of FIG. 1 and in stage E, the call spoofing identifier 118 may receive the response data 142 indicating that the user 112 is not placing a call to the called phone number 152 of 555-5656. In response, the call spoofing identifier 118 may block the telephone call. The server 106 may indicate to the computing device 104 that the server 106 is unable to connect the telephone call. The server 106 may provide a notification 144 that indicates that the call cannot be completed. The server 106 may provide an audio notification 148 that the computing device 104 outputs though a speaker, and the user 102 may hear that "Your call cannot be completed." Because the server 106 blocked the telephone call, the computing device 110 that corresponds to the called phone number 150 may display the interface 146 that does not provide an indication that the user 102 attempted to call the user 108 and the computing device 110.

In some implementations, the call spoofing identifier 118 may be configured to collect forensic data related to the telephone call and the caller in instances where the call spoofing identifier 118 connected the telephone call. The forensic data may include audio of the speech of the users 102 and/or 108. The call spoofing identifier 118 may analyze the audio and determine a voice fingerprint of the users 102 and/or 108, speech patterns of the users 102 and/or 108, and/or any other similar forensic data. The call spoofing identifier 118 may also identify forensic data related to the computing devices 104, 110, and/or 114. This data may include movement data of the computing devices 104, 110, and/or 114 before, during, and/or after the phone call. The call spoofing identifier 118 may analyze forensic data of spoofed telephone calls and non-spoofed telephone calls. The call spoofing identifier 118 may identify patterns in the forensic data. In some instances, the call spoofing identifier 118 may use the patterns to improve the accuracy of the call spoofing identifier 118. For example, if the call spoofing identifier 118 connects a phone call and during the phone call determines that the call is likely a spoofed phone call based on the forensic data, then the call spoofing identifier 118 can provide a notification to the computing device 110 indicating that the phone number may be spoofed. This notification may be an audio notification and/or a notification that appears on the screen of the computing device 110.

Figure 2:
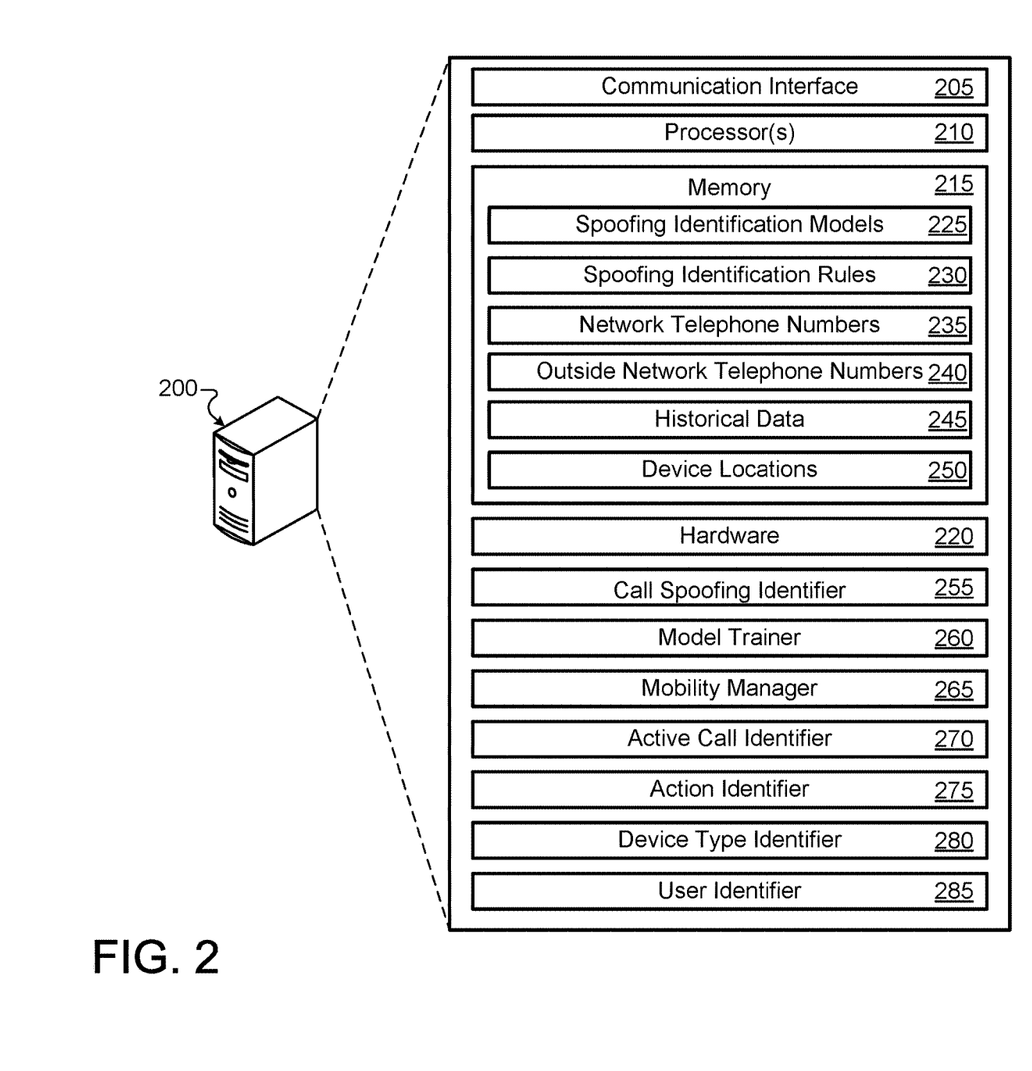
FIG. 2 illustrates an example server that is configured to determine whether the phone number of a telephone call is a spoofed phone number and perform an action based on the determination.

FIG. 2 illustrates an example server 200 that is configured to determine whether the phone number of a telephone call is a spoofed phone number and perform an action based on the determination. The server 200 may be integrated into a wireless carrier network or interact with a wireless carrier network. The server 200 may communicate with other computing devices using a wide area network, a local area network, the internet, a wired connection, a wireless connection, and/or any other type of network or connection. The wireless connections may include Wi-Fi, short-range radio, infrared, and/or any other wireless connection. The server 200 may be similar to the server 106 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices. In some implementations, the communication interface 205 may be configured to communicate over a wide area network, a local area network, the internet, a wired connection, a wireless connection, and/or any other type of network or connection. The wireless connections may include Wi-Fi, short-range radio, infrared, and/or any other wireless connection.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. In some implementations, the data stored in the memory 215 may stored externally from the server 200.

The one or more processors 210 may implement a call spoofing identifier 255. The call spoofing identifier 255 may be similar to the call spoofing identifier 118 of FIG. 1. The call spoofing identifier 255 may be configured to analyze data that reflects various characteristics of a calling phone number to determine a likelihood that the calling phone number is a spoofed phone number. Some of the characteristics may include a location of the computing device placing the phone call, a type of the computing device placing the phone call, the carrier network associated with the telephone call request from the computing device placing the phone call, the carrier network of another device associated with the calling phone number, the location of the other device associated with the calling phone number, and/or any other additional characteristics. The call spoofing identifier 255 may generate the likelihood that the calling phone number is a spoofed phone number in the form of a confidence score. Based on the confidence score, an action identifier 275 may determine an action for the call spoofing identifier 255 to perform in response to the telephone call request.

The call spoofing identifier 255 may access the location data of the various computing devices related to the telephone call from the device locations 250. The device locations 250 may include data related to the current location of the of the calling device and the called device and any other device associated with the calling or called phone numbers. The mobility manager 265 may monitor the locations of the devices communicating with the server 200. The one or more processors 210 may implement the mobility manager 265. The mobility manager 265 may be similar to the mobility manager 122 of FIG. 1. The mobility manager 265 may be configured to monitor the location of a computing device that is connected to the server 200 through a wireless base station. The location of the computing device may include the location of the wireless base station to which the computing device is connected and/or GPS data received from the computing device.

In some implementations, the mobility manager 265 may determine the location of a computing device at periodic intervals, such as every five seconds. In some implementations, the mobility manager 265 may determine the location of a computing device when the computing device connects to a different wireless base station and/or provides updated GPS data. In some implementations, the mobility manager 265 may determine the location of the computing device relative to the base station with which the computing device is communicating. In this case, the mobility manager 265 may determine the relative location based on data collected from the base station such as signal strength and direction of communications between the computing device and the base station. The mobility manager 265 may also determine the relative location based on the location of the base station and GPS data received from the computing device. The relative location data may include a distance between the computing device and the base station, the cardinal direction from the base station to the subscriber device, and/or any other similar measurements.

The call spoofing identifier 255 may receive user identity data from the user identifier 285. The one or more processors 210 may implement the user identifier 285. The user identifier 285 may be similar to the user identifier 130 of FIG. 1. The user identifier 285 may be configured to determine the identity of the users of the calling device, the called device, and any other device associated with the calling or called phone numbers and provide the user identity data to the call spoofing identifier 255. In some instances, the any other device associated with the calling or called phone numbers may be associated with a particular user and/or entity. Each user may be associated with various demographic data such as age, gender, and/or other demographic information. This association data may be stored in the memory 215 or be accessible by the user identifier 285. The user identifier 285 may provide identity data and/or demographic data to the call spoofing identifier 255 based on the user data associated with the calling device, the called device, and any other device associated with the calling or called phone numbers. In some instances, the user identifier 285 may provide data classifying the users of the devices. For example, the user identifier 285 may provide an age range of the users to the call spoofing identifier 255. In some implementations, the user identifier 285 may provide data indicating whether the calling device, the called device, and any other device associated with the calling or called phone numbers are included in the same account with the wireless carrier, as may be the case for the computing devices of each person who are part of the same household. In some implementations, the user identifier 285 may provide data identifying an account owner of the account of the phone number of the calling device, the called device, and any other device associated with the calling or called phone numbers. In some implementations, the user identifier 285 may not have access to identity data for the users of the devices. In this case, the user identifier 285 may not provide identity data to the call spoofing identifier 255.

In some implementations, the user identifier 285 may determine the user identity data based on the data included in the telephone call request from the calling device. The user identifier 285 may determine the user identity data related to the user of the device that matches the calling phone number. The user identifier 285 may determine the user identity data related to the user of the device that matched the called phone number.

The call spoofing identifier 255 may receive device type data from the device type identifier 280. The one or more processors 210 may implement the device type identifier 280. The device type identifier 280 may be similar to the device type identifier 128 of FIG. 1. The device type data may indicate a type of computing device of the calling device, the called device, and any other device associated with the calling or called phone numbers. The device type identifier 280 may be configured to identify a type of device that initiated the telephone call and a type of device that is to receive the telephone call. In some instances, the calling device, the called device, and any other device associated with the calling or called phone numbers may be associated with a phone number. In this case, the device type identifier 280 may access data that relates a phone number to the type of equipment associated with that phone number. In some instances, the calling device, the called device, and any other device associated with the calling or called phone numbers may be associated with a unique identifier such as an international mobile subscriber identity, media access control address, and/or another similar identifier. In this case, the device type identifier 280 may access data that relates the unique identifier to the type of equipment associated with that identifier. The device type identifier 280 may provide data identifying the device types of the calling device, the called device, and any other device associated with the calling or called phone numbers to the call spoofing identifier 255.

In some implementations, the device type identifier 280 may determine the device type data based on the data included in the telephone call request from the calling device. The device type identifier 280 may determine the device type data related to the device that matches the calling phone number. The device type identifier 280 may determine the device type data related to the device that matches the called phone number.

The call spoofing identifier 255 may receive active call data from the active call identifier 270. The one or more processors 210 may implement the active call identifier 270. The active call identifier 270 may be similar to the active call identifier 126 of FIG. 1. The active call identifier 270 may determine whether the called phone number and/or the calling phone number are participating in a telephone call when the server 200 receives the telephone call request. The active call identifier 270 may generate active call data indicating whether the calling phone number is participating in a telephone call. This participation may be different than the telephone call request indicating that a computing device of the calling phone number is attempting to place a telephone call. The active call identifier 270 may generate active call data indicating whether the called phone number is participating in a telephone call. This participation may be different than the telephone call request indicating that a computing device of the calling phone number is attempting to place a telephone call to a computing device of the called phone number.

The call spoofing identifier 255 may access the network telephone numbers 235 of the memory 215. The network telephone numbers 235 may include data identifying the telephone numbers to which the carrier network of the server 200 provides service. For example, the network telephone numbers 235 may identify the phone numbers of the called device and the device that matches the calling number as phone numbers of computing devices to which the carrier network of the server 200 provides service. The phone number of the calling device may not be included in the network telephone numbers 235 because the carrier network of the server 200 may not provide service to the calling device.

The one or more processors 210 may continuously update the network telephone numbers 235 as computing devices and/or phone numbers are added to or removed from the carrier network. For example, a customer of the different carrier network may switch to the carrier network of the server 200. The customer may request keeping the same phone number. In this case, the one or more processors 210 may add the phone number of the customer to the network telephone numbers 235. As another example, another customer of the carrier network of the server 200 may switch to the different carrier network. The other customer may request keeping the same phone number. In this case, the one or more processors 210 may remove the phone number of the other customer from the network telephone numbers 235. In the case of a customer purchasing a new computing device and keeping the same phone number and remaining with the carrier network of the server 200, the one or more processors 210 may maintain the phone numbers in the network telephone numbers 235.

The call spoofing identifier 255 may access the outside network telephone numbers 240 of the memory 215. The outside network telephone numbers 240 may include data identifying the telephone numbers to which other carrier networks provide service. The other carrier networks may be different than the carrier network of the server 200. For example, the outside network telephone numbers 240 may identify the phone number of calling device as a phone number of a computing device to which other carrier networks provide service. The phone numbers of the computing devices called device and the device that matches the calling phone number may not be included in the outside network telephone numbers 240 because the other carrier networks may not provide service to the called device and the device that matches the calling phone number.

The server 200 may receive the data for the outside network telephone numbers 240 from other carrier networks. The server 200 may receive the data to update the outside network telephone numbers 240 at periodic intervals, such as once per day or week. The server 200 may receive the data to update the outside network telephone numbers 240 in response to a request from the server 200. For example, the server 200 may request updated data for the outside network telephone numbers 240. In response, the server 200 may receive updated data for the outside network telephone numbers 240. The server 200 may request updated data in response to a change in the network telephone numbers 235. The server 200 may request updated data in response to being unable to identify a phone number in either the network telephone numbers 235 and/or the outside network telephone numbers 240.

The call spoofing identifier 255 may access the historical data 245 in the memory 215. The historical data 245 may include data related to the various computing devices that communicate with the server 200. In some implementations, the historical data 245 may include data related to the devices to which the carrier network of the server 200 provides phone and/or data service. The historical data 245 may include a date, time, and/or the duration of previous telephone calls. The historical data 245 may include data indicating whether the called party answered the telephone call, whether the voicemail system answered the telephone call, and/or whether the calling party left a voicemail. The historical data 245 may also include data identifying the calling party and data identifying the called party. The data identifying the calling party may include a phone number of the calling party, a name of the calling party, a geographic location of the calling party at the time of the call, a network location of the calling party at the time of the call, data identifying a computing device used by the calling party, and/or any other similar information of the calling party. The data identifying the called party may include a phone number of the called party, a name of the called party, a geographic location of the called party at the time of the call, a network location of the called party at the time of the call, data identifying a computing device used by the called party and/or any other similar information of the called party.

In some implementations, the historical data 245 may include data related to actions that users have performed on the computing devices in addition to telephone call related actions. These actions may include network data received or transmitted by the computing devices. This may include messages sent or received by the computing devices and data related to other applications of the computing devices. The historical data 245 may include data related to applications installed on the computing devices. The server 200 may identify the applications based on the data transmitted and received by the computing devices.

The call spoofing identifier 255 may analyze the user identity data, the device type data, the active call data, the location data, the historical data, and data indicating whether the calling phone number and called phone number are included in the network telephone numbers 235 or the outside network telephone numbers 240 using the spoofing identification models 225 and/or the spoofing identification rules 230. The call spoofing identifier 255 may determine a likelihood that the calling device is spoofing the calling phone number using the spoofing identification models 225 and/or the spoofing identification rules 230. A confidence score may reflect the likelihood that the calling device is spoofing the calling phone number. For example, a confidence score of 0.8 may indicate an eighty percent chance that the calling device is spoofing the calling phone number. A confidence score of 0.4 may indicate a forty percent chance that the calling device is spoofing the calling phone number.

The one or more processors 210 may implement the model trainer 260. The model trainer 260 may be configured to train the spoofing identification models 225 using the historical data 245 and machine learning. The spoofing identification models 225 may be configured to receive the user identity data, the device type data, the active call data, the location data, the historical data, and/or data indicating whether the calling phone number and called phone number are included in the network telephone numbers 235 or the outside network telephone numbers 240. The spoofing identification models 225 may output data indicating a likelihood that the calling device is spoofing the calling phone number.

The model trainer 260 may generate data samples using the historical data 245. The model trainer 260 may train the spoofing identification models 225 using the data samples. A data sample may correspond to a previous phone call and may include user identity data, the device type data, the active call data, the location data, the historical data, and/or data indicating whether the calling phone number and called phone number are included in the network telephone numbers or the outside network telephone numbers and a label indicating whether the calling device used a spoofed phone number. The historical data 245 may include the data indicating whether previous phone calls used a spoofed number from receiving feedback from various users who received phone calls. In some instances, a user who received a phone call may receive a prompt after the phone call to provide input whether the phone call was from a spoofed phone number. The response data from the users may be included in the historical data 245 along with the user identity data, the device type data, the active call data, the location data, the historical data, and/or data indicating whether the calling phone number and called phone number are included in the network telephone numbers or the outside network telephone numbers that is relevant to that phone call.

The model trainer 260 may group data samples that include similar types of data. In some instances, the historical data 245 may not include some types of data for a previous phone call. For example, a data sample may include active call data, location data, and data indicating whether the calling phone number and called phone number are included in the network telephone numbers or the outside network telephone numbers. The data sample may also include a label indicating whether the calling device used a spoofed phone number. The model trainer 260 may group that data sample with other data samples that includes those types of data.

The model trainer 260 may train various spoofing identification models 225 using the data samples and machine learning. Each spoofing identification model may be configured to receive different types of data depending on the data included in the group of data samples. For example, a spoofing identification model may be configured to receive active call data, user identity data, and device type data. Another spoofing identification model may be configured to receive user identity data, location data, and data indicating whether the calling phone number and called phone number are included in the network telephone numbers or the outside network telephone numbers. Each of these spoofing identification model may be configured to output data indicating a likelihood that the calling device is spoofing the telephone number.

In some instances, the data samples user identity data, the device type data, the active call data, the location data, the historical data, and/or data indicating whether the calling phone number and called phone number are included in the network telephone numbers or the outside network telephone numbers for each of the computing devices involved in the telephone call. This may include the calling device, the called device, and/or a device that corresponds to the calling phone number. The data sample may also include data identifying which data corresponds to each device. For example, a data sample may include no information for the calling device, location data and device type data for the device that corresponds to the calling phone number, location data and active call data for the called device, and a label indicating whether the corresponding call included a spoofed number. The data sample may also include data indicating which device is the calling device, which is the called device, and which is the device that corresponds to the calling phone number. In some instances, the data sample may not include any information for the calling device. The model trainer 260 may group data samples and train spoofing identification models to receive various combinations of data and output data indicating a likelihood that the phone number is spoofed.

The model trainer 260 may also be configured to generate the spoofing identification rules 230. The model trainer 260 may analyze the historical data 245 and identify patterns in the historical data 245 that may indicate whether the calling device is spoofing the calling phone number. For example, if the location data of the calling device is different than the location data of the device that corresponds to the calling phone number, then the calling device is likely spoofing the calling phone number. If the service provider of the calling device is different than the service provider of the device that corresponds to the calling phone number, then the calling device is likely spoofing the calling phone number. If the device that corresponds to the calling phone number is participating in another call, then the calling device is likely spoofing the calling phone number. If the device that corresponds to the calling phone number has not previously called the called phone number, then the calling device is possibly spoofing the calling phone number. If the device that corresponds to the calling phone number has previously called the called phone number within the last three days, then the calling device is likely not spoofing the calling phone number.

The call spoofing identifier 255 may use a combination of the spoofing identification models 225 and the spoofing identification rules 230. In some instances, if a spoofing identification rule provides data indicating whether the calling device is likely spoofing the calling phone number, then the call spoofing identifier 255 may not use the spoofing identification models 225. If the spoofing identification models 225 does not include a rule that indicates whether the calling device is likely spoofing the calling phone number, then the call spoofing identifier 255 may access the spoofing identification models 225 and select a model that is configured to receive the data that the call spoofing identifier 255 received related to the current phone call.

The one or more processors 210 may implement an action identifier 275. The action identifier 275 may be similar to the action identifier 136 of FIG. 1. The call spoofing identifier 255 may provide the data indicating the likelihood that the calling device is spoofing the calling phone number to the action identifier 275. The action identifier 275 may be configured to select an action based on the data indicating the likelihood that the calling device is spoofing the calling phone number. Some of the actions may include connecting the telephone call, blocking the telephone call, transmitting a notification to the computing device that corresponds to the calling phone number, and/or transmitting a notification to the computing device that corresponds to the called phone number.

In some implementations, the action identifier 275 may select an action based on a range within which the data indicating the likelihood that the calling device is spoofing the calling phone number falls. For example, if the data indicating the likelihood that the calling device is spoofing the calling phone number is less than 0.3, then the action identifier 275 may select the action of connecting the telephone call and not providing a notification to the computing device that corresponds to the calling phone number. If the data indicating the likelihood that the calling device is spoofing the calling phone number is greater than 0.7, then the action identifier 275 may select the action of blocking the telephone call and providing a notification to the computing device that corresponds to the calling phone number. If the data indicating the likelihood that the calling device is spoofing the calling phone number is between 0.3 and 0.7, then the action identifier 275 may select the action of providing a notification to the computing device that corresponds to the calling phone number. The notification may request that the user of the computing device that corresponds to the calling phone number indicate whether the user is placing a call to the called phone number.

The call spoofing identifier 255 may perform the action selected by the action identifier 275. The action may include a single step or multiple steps. Some of the single step actions may include blocking or permitting the phone call. Some of the multiple step actions may include requesting input from a user of the device that corresponds to the calling phone number. The call spoofing identifier 255 may request data indicating whether the user is placing a call to the called phone number. Another multiple step action may include blocking the phone call and providing a notification to the user of the device that corresponds to the calling phone number indicating that the phone number of the user was spoofed. Another multiple step action may include permitting the phone call and providing a notification to the user of the device that corresponds to the calling phone number requesting data indicating whether the user placed the phone call.

Figure 3:
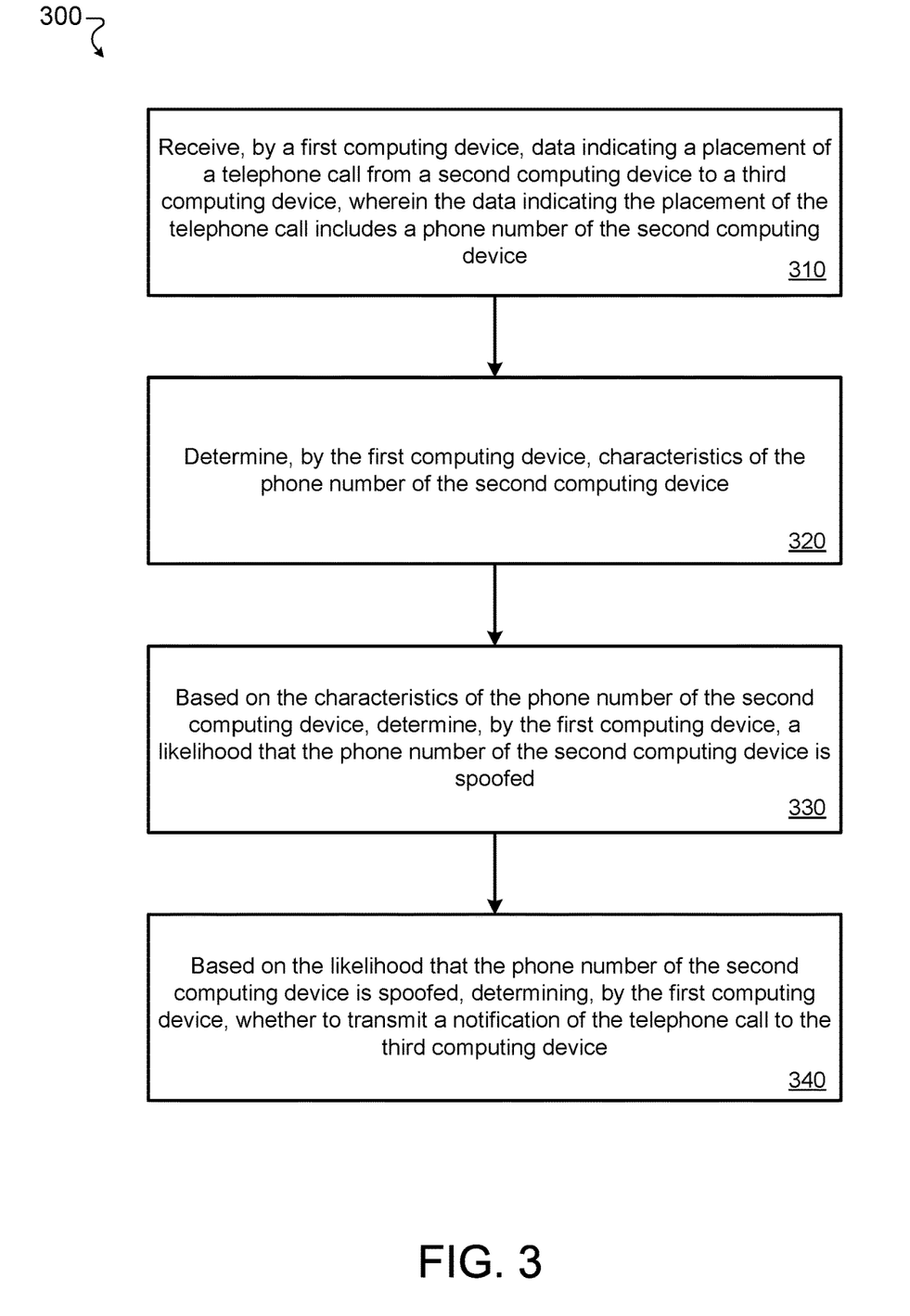
FIG. 3 is a flowchart of an example process for determining whether the phone number of a telephone call is a spoofed phone number and performing an action based on that determination.

FIG. 3 is a flowchart of an example process 300 for determining whether the phone number of a telephone call is a spoofed phone number and performing an action based on that determination. In general, the process 300 receives data indicating a telephone call from a calling device. The data indicating the telephone call may include a calling phone number and a called phone number. The process 300 may determine characteristics of the calling device and devices that correspond to the calling phone number and the called phone number. Based on those characteristics, the process 300 determines a likelihood that the calling device is spoofing the calling phone number. The process 300 will be described as being performed by the server 106 of FIG. 1 and will include references to other components in FIG. 1. In some implementations, the process 300 may be performed by the server 200 of FIG. 2.

The server 106 receives data indicating a placement of a telephone call from a second computing device 104 to a third computing device 110, wherein the data indicating the placement of the telephone call includes a phone number of the second computing device 104 (310). In some implementations, the server 106 may not receive additional information related to the second computing device 104 such as type of computing device, location, and/or any other similar information.

The server 106 determines characteristics of the phone number of the second computing device 104 (320). In some implementations, the server 106 may determine characteristics of a fourth computing device 114 that is associated with the phone number. In some implementations, the characteristics of the phone number include determining whether the phone number is associated with an active, different telephone call. In some implementations, the characteristics of the phone number include a network service provider of the fourth computing device 114 that is associated with the phone number. In some implementations, the characteristics of the phone number include a location of the second computing device 104.

Based on the characteristics of the phone number of the second computing device, the server 106 determines a likelihood that the phone number of the second computing device 104 is spoofed (330). The server 106 may determine the likelihood that the phone number of the second computing device 104 is spoofed by analyzing the characteristics of the phone number of the second computing device 104, characteristics of the third computing device 110, characteristics of the second computing device 104, and/or characteristics of the fourth computing device 114 using rules and/or models. The rules and models may be configured to determine a confidence score that reflects the likelihood that the phone number of the second computing device 104 is spoofed.

Based on the likelihood that the phone number of the second computing device is spoofed, the server 106 determines whether to transmit a notification of the telephone call to the third computing device 110 (340). The server 106 may connect the phone call and the notification may indicate that the third computing device 110 is receiving a phone call from the phone number. The server 106 may block the phone call and not transmit a notification to the third computing device 110.

In some implementations, the server 106 determines to transmit a notification of the telephone call to the fourth computing device 104. The server 106 may transmit the notification before connecting or blocking the telephone call. In this case, the server 106 may request that the user 112 of the fourth computing device 104 provide data indicating whether the user 112 is placing a call to the phone number. If the user 112 confirms that the user 112 is placing the call to the phone number, then the server 106 may connect the phone call. If the user 112 confirms that the user 112 is not placing a call to the phone number, then the server 106 may block the phone call.

In some implementations, the server 106 may determine whether to block the telephone call or connect the telephone call and perform that action. In some instances, after blocking or connecting the telephone call, the server 106 may transmit a notification to the fourth computing device 114. If the server 106 blocked the phone call, then the notification may indicate that the phone number of the fourth computing device 114 was likely spoofed. If the server 106 connected the phone call, then the notification may indicate that fourth computing device 114 placed the phone call.

In some implementations, the server 106 may connect the phone call and provide an indication to the third computing device 110 related to the likelihood of the phone number being spoofed. The indication may provide a warning to the user 108 of the third computing device 110. The severity of the warning may be related to the confidence score. A confidence score that reflects a higher likelihood that the phone number is spoofed may cause a more severe warning. A confidence score that reflects a lower likelihood that the phone number is spoofed may cause a less sever warning.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
   receiving, by a first computing device, data indicating a placement of a telephone call from a second computing device to a third computing device, wherein the data indicating the placement of the telephone call includes a phone number of the second computing device;
   identifying, by the first computing device, a fourth computing device associated with the phone number of the second computing device;
   providing, for output by the first computing device and to the fourth computing device, a request to provide data indicating whether the phone number of the second computing device is spoofed;

receiving, by the first computing device and from the fourth computing device, a response that is to the request and that includes the data indicating whether the phone number of the second computing device is spoofed;

based on the data indicating whether the phone number of the second computing device is spoofed, determining, by the first computing device, a likelihood that the phone number of the second computing device is spoofed; and based on the likelihood that the phone number of the second computing device is spoofed, determining, by the first computing device, whether to transmit a notification of the telephone call to the third computing device.

2. The method of claim 1, wherein:

determining whether to transmit the notification of the telephone call to the third computing device comprises determining to transmit the notification of the telephone call to the third computing device, and the method comprises:

based on the likelihood that the phone number of the second computing device is spoofed and based on determining to transmit the notification of the telephone call to the third computing device, generating, by the first computing device, the notification that includes the phone number of the second computing device; and transmitting, by the first computing device and to the third device, the notification.

3. The method of claim 1, wherein:

determining whether to transmit the notification of the telephone call to the third computing device comprises determining to transmit the notification of the telephone call to the third computing device, and the method comprises:

based on the likelihood that the phone number of the second computing device is spoofed and based on determining to transmit the notification of the telephone call to the third computing device, generating, by the first computing device, the notification that includes data warning a user of the third computing device of a possibility that the phone number of the second computing device is spoofed; and transmitting, by the first computing device and to the third device, the notification.

4. The method of claim 1, wherein:

determining whether to transmit the notification of the telephone call to the third computing device comprises determining to bypass transmitting the notification of the telephone call to the third computing device, and the method comprises:

based on determining to bypass transmitting the notification of the telephone call to the third computing device, providing, by the first computing device and to the second computing device, access to a voicemail system.

5. The method of claim 1, comprising:

determining that the phone number is associated with an active, different telephone call, wherein determining the likelihood that the phone number of the second computing device is spoofed is further based on the phone number being associated with an active, different telephone call.

6. The method of claim 1, comprising:

determining a network service provider of the phone number, wherein determining the likelihood that the phone number of the second computing device is spoofed is further based on the network service provider of the phone number.

7. The method of claim 1, comprising:

determining a location of the second computing device, wherein determining the likelihood that the phone number of the second computing device is spoofed is further based on the location of the second computing device.

8. The method of claim 1, wherein the second computing device and the fourth computing device are different devices.

9. The method of claim 1, wherein the second computing device and the fourth computing device are a same device.

10. A system, comprising:

one or more processors; and memory including a plurality of computer-executable components that are executable by the one or more processors to perform a plurality of actions, the plurality of actions comprising:

receiving, by a first computing device, data indicating a placement of a telephone call from a second computing device to a third computing device, wherein the data indicating the placement of the telephone call includes a phone number of the second computing device;

identifying, by the first computing device, a fourth computing device associated with the phone number of the second computing device;

providing, for output by the first computing device and to the fourth computing device, a request to provide data indicating whether the phone number of the second computing device is spoofed;

receiving, by the first computing device and from the fourth computing device, a response that is to the request and that includes the data indicating whether the phone number of the second computing device is spoofed;

based on the data indicating whether the phone number of the second computing device is spoofed, determining, by the first computing device, a likelihood that the phone number of the second computing device is spoofed; and based on the likelihood that the phone number of the second computing device is spoofed, determining, by the first computing device, whether to transmit a notification of the telephone call to the third computing device.

11. The system of claim 10, wherein:

determining whether to transmit the notification of the telephone call to the third computing device comprises determining to transmit the notification of the telephone call to the third computing device, and the method comprises:

based on the likelihood that the phone number of the second computing device is spoofed and based on determining to transmit the notification of the telephone call to the third computing device, generating, by the first computing device, the notification that includes the phone number of the second computing device; and transmitting, by the first computing device and to the third device, the notification.

12. The system of claim 10, wherein:

determining whether to transmit the notification of the telephone call to the third computing device comprises determining to transmit the notification of the telephone call to the third computing device, and the method comprises:

based on the likelihood that the phone number of the second computing device is spoofed and based on determining to transmit the notification of the telephone call to the third computing device, generating, by the first computing device, the notification that includes data warning a user of the third computing device of a possibility that the phone number of the second computing device is spoofed; and transmitting, by the first computing device and to the third device, the notification.

13. The system of claim 10, wherein:

determining whether to transmit the notification of the telephone call to the third computing device comprises determining to bypass transmitting the notification of the telephone call to the third computing device, and the method comprises:

based on determining to bypass transmitting the notification of the telephone call to the third computing device, providing, by the first computing device and to the second computing device, access to a voicemail system.

14. The system of claim 10, comprising:

determining that the phone number is associated with an active, different telephone call, wherein determining the likelihood that the phone number of the second computing device is spoofed is further based on the phone number being associated with an active, different telephone call.

15. The system of claim 10, comprising:

determining a network service provider of the phone number, wherein determining the likelihood that the phone number of the second computing device is spoofed is further based on the network service provider of the phone number.

16. The system of claim 10, comprising:

determining a location of the second computing device, wherein determining the likelihood that the phone number of the second computing device is spoofed is further based on the location of the second computing device.

17. One or more non-transitory computer-readable media of a computing device storing computer-executable instructions that upon execution cause one or more computers to perform acts comprising:

receiving, by a first computing device, data indicating a placement of a telephone call from a second computing device to a third computing device, wherein the data indicating the placement of the telephone call includes a phone number of the second computing device;

identifying, by the first computing device, a fourth computing device associated with the phone number of the second computing device;

providing, for output by the first computing device and to the fourth computing device, a request to provide data indicating whether the phone number of the second computing device is spoofed;

receiving, by the first computing device and from the fourth computing device, a response that is to the request and that includes the data indicating whether the phone number of the second computing device is spoofed;

based on the data indicating whether the phone number of the second computing device is spoofed, determining, by the first computing device, a likelihood that the phone number of the second computing device is spoofed; and based on the likelihood that the phone number of the second computing device is spoofed, determining, by the first computing device, whether to transmit a notification of the telephone call to the third computing device.

* * * * *